Dec. 30, 1952  R. N. FALGE  2,623,986
DIRIGIBLY MOUNTED COMBINATION SPOTLAMP AND MIRROR
Filed Aug. 18, 1948
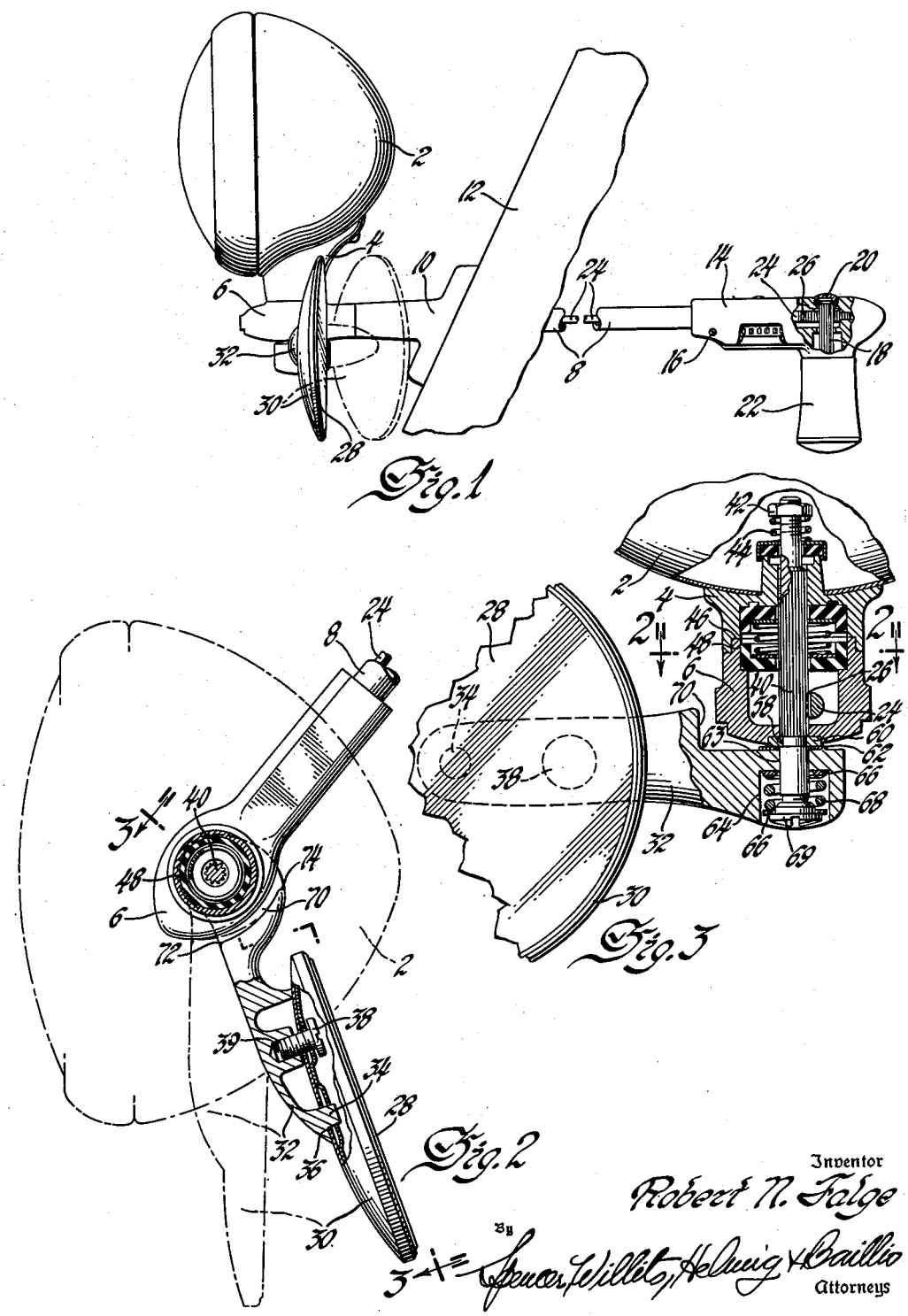
Inventor
Robert N. Falge
By Spencer, Willett, Helmig & Baillio
Attorneys Patented Dec. 30, 1952

2,623,986

UNITED STATES PATENT OFFICE 2,623,986

DIRIGIBLY MOUNTED COMBINATION SPOTLAMP AND MIRROR

Robert N. Falge, Anderson, Ind., assignor to General Motors Corporation, Detroit, Mich., a corporation of Delaware Application August 18, 1948, Serial No. 44,926

5 Claims. (Cl. 240—4.2)

The present invention relates to dirgibly mounted spotlights and more particularly to spotlights having a rear view mirror as part of the spotlight assembly.

As spotlights are generally mounted on one of the forward cab posts of a vehicle adjacent the windshield, the mounting of an outwardly extending rearview mirror on the lamp housing forms an additional obstruction to the operator's view which is both annoying to the operator and hazardous. Mounting the mirror at a lower position on the lamp housing where it would be less apt to form an obstruction to the operator's view would be undesirable as the mirror would interfere with the turning movement at the lamp thus rendering the turning mechanism for the lamp inoperative throughout a substantial part of the lamp's field of rotation.

It is therefore an object of the present invention to provide a dirigibly mounted spotlight with means for attaching a rearview mirror to the spotlight assembly so that it may be adjusted by the spotlight adjusting mechanism without interfering with the turning movement of the lamp and will not offer an annoying and hazardous obstruction to the view of the operator of the vehicle.

This and other objects are attained in accordance with the present invention by providing a spotlight with means for mounting a rearview mirror and its supporting bracket below the supporting arm for the spotlight lamp housing.

The novel features which are characteristic of my invention are set forth with particularity in the appended claims. The invention itself will be best understood by reference to the following specification when considered in connection with the accompanying drawing in which:

Figure 1 is a side view of a dirigibly mounted spotlight and rearview mirror assembly bracket embodying the present invention; Figure 2 is a is a view taken along the line 2—2 of Figure 3, and Figure 3 is a view taken along the line 3—3 of Figure 2.

Referring now to the drawing and more particularly to Figure 1 there is illustrated a spotlight of conventional construction provided with a rearview mirror which is attached to the spotlight below the supporting arm for the spotlight lamp housing. The assembly comprises a lamp housing 2 attached to a boss 4 which is mounted for rotation about one axis on a supporting arm 6. The supporting arm 6 is attached to one end of an elongated tubular shaft 8 which is mounted for rotation about another axis in an apertured bracket 10. The bracket 10 is attached to a convenient part of a vehicle as, for example, either of the two forward cab posts 12. To mount the assembly on the cab post 12 a bore is provided in the cab post 12 which cooperates with the aperture in the bracket 10 to receive the elongated tubular member 8. A gear housing 14 is attached to the other end of the tubular member 8 by a screw threaded member 16. A pinion gear 18 has one end journaled in a bearing 20 recessed in the gear housing 14 and the other end attached to the turning handle 22. An elongated rod member 24 having gear racks 26 adjacent each end is reciprocably mounted in the tubular member 8 and forms part of the gear train for transferring rotary motion from the handle 22 to the spotlight lamp housing 2. A mirror 28 preferably of glass having one surface coated with a light reflecting material, is mounted in a metallic shell 30 and attached through a bracket member 32 to the spotlight assembly below the supporting arm 6. As shown in Figure 2, the means by which the mirror housing shell 30 is attached to the bracket 32 comprises a boss 34 integral with bracket member 32 which cooperates with an aperture 36 in the housing shell to locate the housing shell 30 on the bracket 32 and a screw-threaded member 38 which cooperates with a threaded recess 39 in bracket member 32 to provide means for fixing the mirror and its housing shell to the bracket 32.

Referring now to Figure 3 of the drawing, a pinion gear 40 is centrally mounted within the boss 4 and the supporting arm 6. The pinion gear 40 is splined to the boss 4 at its upper end and is provided with an adjusting nut 42 and spring 44 for varying the tension between the boss 4 and the supporting arm 6. The boss 4 is provided with a recessed portion 46 which cooperates with a tongue 48 on the supporting arm 6 to provide means for centering the lamp housing 2 and boss 4 for rotation on the supporting arm 6. A pair of cup-shaped insulating bushings are recessed respectively in the boss 4 and the supporting arm 6 with a spring member and a pair of metal washers positioned between the bushings. The bushings are provided with terminal contacts (not shown) which engage the metal washers and with the spring form a circuit conducting path between the relatively moving parts which is commonly used in the present type of spotlight assembly. The lower end of the pinion 40 is engaged by the other gear rack 26 of the elongated rod member 24 to transfer the reciprocating movement of the rod 24 into a turning movement for the lamp housing 2. Adjacent the lower end of the pinion gear 40 there is provided a groove 58 which is adapted to receive a C-shaped washer 60 which is recessed in the lower end of the supporting arm 6 and with the turning nut 42 locks the lamp housing 2, boss 4 and supporting arm 6 in assembled relationship. The mirror bracket 32 is mounted for rotation on the lower end of the pinion 40 which extends below the supporting arm 6 with a washer 62 interposed between the mirror bracket 32 and the C-shaped washer 60. The mirror bracket 32 is provided with an opening 63 for positioning the bracket on the lower end of pinion 40 and an adjoining recess 64 which is adapted to receive a pair of washers 66, a spring member 68 and a screw-threaded member 69 which fastens the bracket arm 32, the washers 66 and the spring 68 in assembled relationship to form a friction clutch between the pinion 40 and the mirror bracket 32. The mirror bracket is formed with an additional recessed portion 70 which provides stop members 72 and 74 on each side of the bracket 32 for engaging the supporting arm 6 and limiting the rotary movement of the mirror and its supporting arm about the axis of the pinion 40.

In operation, the lamp housing 2 may be turned about one axis by turning the handle 22. Applying a turning movement to the handle 22 causes the pinion 18 to rotate and the rotary movement is transferred to the gear rack 26 of the elongated member 24 which reciprocates in the tubular member 8. At the other end of the elongated rod member 24 a similar gear rack 26 engages the gear teeth of pinion 40 and transfers the reciprocating movement of the elongated rod member 24 to the pinion 40 and thus to the lamp housing 2 through the splined connection between the pinion 40 and the boss 4. The rotary movement of the pinion 40 is likewise transferred to the mirror bracket 32 through the friction clutch assembly comprising the washers 66, spring 68 screw-threaded member 69 and the cooperating surface of bracket 32. The turning movement of the mirror and its supporting bracket is limited by the stops 72 and 74 when they engage the sides of the supporting arm 6 thereby providing adjustability of the mirror sufficient to enable the operator of the vehicle to adjust the mirror to the most convenient position for viewing the areas to the rear and adjacent the vehicle. The position of the lamp housing 2 may be varied about the axis of the tubular member 8 by turning the gear housing 14 with the handle 22 acting as a lever.

While the embodiment of the present invention as herein disclosed constitutes a preferred form, it is to be understood that other forms might be adopted all coming within the scope of the claims which follow.

What I claim as new and desire to secure by United States Letters Patent is:

1. In a dirigibly mounted spotlight the combination of a lamp housing, a support for rotatably mounting said housing thereon, manually operable means for rotating said housing on said support including a pinion shaft having one end operatively connected to said lamp housing and the other end extending through said support, a bracket mounted on the other end of said pinion shaft, a mirror attached to said bracket, a friction clutch for operatively connecting said bracket to said pinion shaft to provide rotation of said bracket and mirror with said lamp housing and oppositely disposed stops on said bracket for engaging said support and limiting the angular displacement of said mirror and bracket.

2. In a dirigibly mounted spotlight the combination of a support, a lamp housing positioned on one side of said support for rotation thereon, a pinion shaft attached to said housing and projecting through said support, said pinion shaft having retaining means in engagement with the other side of said support, an arm mounted on said shaft, means for yieldingly urging said arm into frictional engagement with said retaining means, a mirror mounted on said arm, a tube having one end in engagement with said support, a gear rack reciprocably mounted in said tube with one end in engagement with said pinion shaft, a pinion shaft housing attached to the other end of said tube, and a manually operable pinion shaft in engagement with the other end of said gear rack.

3. In a dirigibly mounted spotlight the combination of a support, a lamp housing disposed on one side of said support for rotation thereon, a member connected to said housing for rotation therewith and having an end portion extending through said support, a mirror assembly rotatably mounted on the other side of said support, a stop on said assembly adapted to engage said support and limit the rotation of said assembly to a predetermined range, a friction clutch connecting said assembly to said end portion to permit relative rotation of said arm and said end portion, and manually operable driving means connected with said member.

4. In a spotlight, the combination of a vehicle body member, a lamp and a mirror rotatably mounted on said member for restricted concurrent rotation of the two and unrestricted rotation of the lamp, a remote control mechanism extending through said member and operatively connected to both said lamp and said mirror, and limit means independent of said lamp for restricting the rotation of said mirror to a limited range.

5. In a spotlight, the combination of a vehicle body member, a lamp mounted on said member for unrestricted rotation, a mirror assembly mounted on said member for concurrent rotation with said lamp through a restricted range, a yieldable coupling between said lamp and said assembly to permit relative rotation therebetween, a remote control mechanism extending through said member and connected with both said lamp and said mirror, and means on said member for determining the limits of said range and restricting the rotation of said assembly to said range.

ROBERT N. FALGE.

REFERENCES CITED

The following references are of record in the file of this patent:

UNITED STATES PATENTS

| Number | Name | Date |
|---|---|---|
| 1,205,625 | Hawthorne | Nov. 21, 1916 |
| 1,237,524 | Kaufmann | Aug. 21, 1917 |
| 1,276,850 | Yokel | Aug. 27, 1918 |
| 1,364,268 | Fletcher | Jan. 4, 1921 |
| 1,369,756 | Wakefield | Feb. 22, 1921 |
| 1,515,005 | Wolter | Nov. 11, 1924 |
| 1,558,641 | Short | Oct. 27, 1925 |
| 1,772,918 | Sklarek | Aug. 12, 1930 |

FOREIGN PATENTS

| Number | Country | Date |
|---|---|---|
| 13,402 | England | of 1911 |
| 625,902 | France | May 2, 1927 |